US009451868B2

(12) United States Patent
Ugel et al.

(10) Patent No.: US 9,451,868 B2
(45) Date of Patent: Sep. 27, 2016

(54) DISHWASHER AND METHOD FOR DETECTING THE WATER LEVEL WITHIN A DISHWASHER

(71) Applicant: ELECTROLUX HOME PRODUCTS CORPORATION N.V., Brussels (BE)

(72) Inventors: Maurizio Ugel, Porcia (IT); Enrico Brambilla, Milan (IT)

(73) Assignee: Electrolux Home Products Corporation N.V., Brussels (BE)

( * ) Notice: Subject to any disclaimer, the term of this patent is extended or adjusted under 35 U.S.C. 154(b) by 269 days.

(21) Appl. No.: 14/074,300

(22) Filed: Nov. 7, 2013

(65) Prior Publication Data
US 2014/0124005 A1    May 8, 2014

(30) Foreign Application Priority Data

Nov. 8, 2012 (EP) .................... 12191889

(51) Int. Cl.
*B08B 7/04* (2006.01)
*B08B 9/20* (2006.01)
*A47L 15/42* (2006.01)
*H02P 7/295* (2016.01)
*A47L 15/00* (2006.01)

(52) U.S. Cl.
CPC ........ *A47L 15/4244* (2013.01); *A47L 15/0047* (2013.01); *A47L 15/0052* (2013.01); *H02P 7/295* (2013.01); *A47L 2401/08* (2013.01); *A47L 2401/09* (2013.01); *A47L 2501/01* (2013.01); *A47L 2501/02* (2013.01)

(58) Field of Classification Search
None
See application file for complete search history.

(56) References Cited

U.S. PATENT DOCUMENTS

| 4,481,786 A | 11/1984 | Bashark |
| 4,584,507 A * | 4/1986 | Taylor ................. H02P 23/0077 388/813 |
| 5,237,256 A | 8/1993 | Bashark |
| 2005/0005952 A1 * | 1/2005 | Bashark .............. A47L 15/0023 134/18 |

OTHER PUBLICATIONS

European Extended Search Report dated May 17, 2013, for corresponding Application No. EP12191889.0.

* cited by examiner

*Primary Examiner* — Eric Golightly
*Assistant Examiner* — Arlyn I Rivera-Cordero
(74) *Attorney, Agent, or Firm* — Alston & Bird LLP

(57) ABSTRACT

The invention relates to a method for detecting a water level in a dishwasher comprising a circulation pump and a TRIAC connected to the circulation pump for providing electrical power to a motor (20) of the circulation pump. According to the invention, a firing angle condition (18) of the TRIAC is used to derive the water level in the dishwasher.

The invention further relates to a dishwasher comprising a circulation pump and a TRIAC connected to the circulation pump for providing electrical power to a motor of the circulation pump, a drain pump connected to a sump of the dishwasher, means for detecting a firing angle condition of the TRIAC. Control means are provided for starting the drain pump and/or supplying additional water when predefined conditions of the TRIAC firing angle are reached.

8 Claims, 1 Drawing Sheet

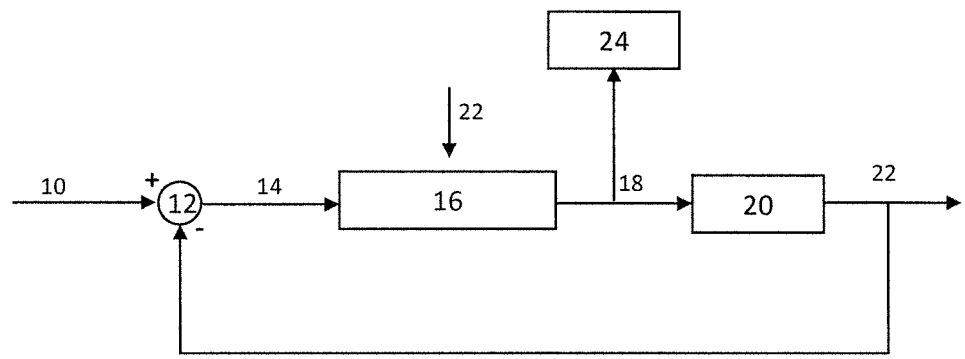

DISHWASHER AND METHOD FOR DETECTING THE WATER LEVEL WITHIN A DISHWASHER

CROSS REFERENCE TO RELATED APPLICATIONS

This application claims priority from European Patent Application No. 12191889.0, filed Nov. 8, 2012, which is incorporated by reference herein in its entirety.

FIELD OF THE INVENTION

The present invention relates to a method for detecting a water level in dishwasher where the dishwasher comprises a circulation pump and a TRIAC connected to the circulation pump for providing electrical power to a motor of the circulation pump.

The present invention also relates to a method for controlling a dishwasher comprising a water sump, a circulation pump, a TRIAC connected to the circulation pump for providing electrical power to a motor of the circulation pump and a drain pump, where at least one washing program is provided comprising at least one washing cycle.

BACKGROUND

Known dishwashers comprise a washing tub in which usually one or two horizontal shelves are provided to hold the dishes to be washed, where within the tub a plurality of spray nozzles or spray rotors are provided to direct a washing liquid towards the dishes. The washing liquid can be water or a mixture of water and a detergent (for simplification in the following also referred to as "water") and is collected in a sump which is located at the bottom of the tub in which is fluidly connected to a drain pump and a circulation pump. The drain pump is provided for sucking in water out of the sump and pumping it out of the dishwasher (e.g. at the beginning and/or at the end of a wash cycle), whereas the circulation pump is provided for pumping the water up to the nozzles in order to sustain the circular flow of water from the sump up to the nozzles and again back to the sump.

The circulation pump may work at different speeds according to the desired pressure at the nozzles. Usually, when the sump is completely filled with water, the circulation pump is started and sucks in water in order to provide for the circular flow.

At the beginning of a washing cycle known dishwashers start a drain step where the drain pump is started in order to be sure that there is no water remaining in the sump (from a previous washing cycle). This operation is also performed in a situation where the sump is already empty and consumes electrical power and produces noise. At a later phase known dishwashers load a fixed amount of water depending on the signal from a pressure switch or sensor detecting the current water level.

It is an object of the present invention to provide for improved methods and an improved dishwasher where the power consumption as well as the noise emission is reduced.

SUMMARY OF THE INVENTION

In accordance with a first aspect of the present invention this object is achieved by a method as it is defined in claim 1. In particular, the present invention thus provides for a method for detecting a water level in dishwasher, in which method a firing angle condition of a TRIAC of the dishwasher, which is connected to a circulation pump for providing electrical power to a motor of the circulation pump, is detected and/or used to derive the water level in the dishwasher. "Detection" of the TRIAC firing angle should be understood in a way that a firing angle that is applied to the TRIAC (e.g. by a control unit preferably based on an appropriate algorithm for a speed controlling fed-back loop) is also used or readout in order to use the value for deriving or calculating the water lever. The use of a specific detector is an alternative.

A TRIAC (Triode for Alternating Current) is a power semiconductor electronic component that conducts in both directions when triggered through a gate. Provided that the voltage supply for households is a sinus curve (voltage as a function of time), the effective power provided to a motor of a dishwasher that is controlled by means of a TRIAC, depends on the point of time where the TRIAC is triggered by an electrical pulse applied to the gate so as to direct electrical power to the motor. The position of the triggering point of the TRIAC relative to the sinus curve of the voltage supply is called the firing angle. A triggering of the TRIAC e.g. when the sinus curve reaches its first zero crossing is usually assigned to a TRIAC angle of 0°.

According to the present invention the firing angle condition of the TRIAC is used to derive the water level in a dishwasher. This is possible since when the motor is running at a fixed speed, the TRIAC firing angle (TFA) value depends on the amount of water in the sump and as a consequence the water level in the dishwasher can be derived without the need of an additional pressure sensor.

In a preferred embodiment of such a method the speed of the motor is controlled by means of a feedback-loop where the motor speed is detected (here by means of a speed detector like a tachymeter) and the electrical power consumption of the motor is adjusted by adjusting the TRIAC firing angle so as to result in a speed of the motor being as closest possible to a preselected value. The advantage of such a feedback control is the fact that the motor speed or force can be adapted to a higher water throughput or pressure if needed at the openings of spray nozzles which can be achieved by shifting the TRIAC firing angle such that more electrical power is provided towards the motor.

According to a further preferred embodiment predefined TRIAC firing angle conditions are assigned to specific water levels in the dishwasher. For example in case a relatively high water level is present in the dishwasher the resulting water pressure at the level of the circulation pump is also relatively high. This is reflected by a firing angle condition where relatively high level of electrical power is provided towards the motor of the circulation pump in order to pump the water.

In a further preferred embodiment of this method instability conditions for the detected TRIAC firing angle are defined and assigned to water level conditions where the circulation pump is sucking in air only or mixture of air and water. This is because in case there is not enough water in the sump, the pump sucks air and the resulting average resistance of the fluid (water and air) passing through the pump is lower. Therefore, the energy needed for the pump motor in order to maintain a desired fixed speed is lower as well. In the extreme case that the pump sucks in air only, the pump motor does not feel any resistance at all in even with the very small amount of energy (i.e. very small firing angle of the TRIAC) the pump motor spins at a maximum speed. This is a typical condition in which the pump is out of control because the feedback-loop and the related algorithm can no more control and maintain a desired motor speed. As a result, the circulation pump either spins at a maximum speed. Such instabilities or instability conditions can be used to define values or instability conditions for the resulting detected TRIAC firing angle which are assigned to water level conditions where the circulation pump sucking in air only or mixture of air and water.

According to the second aspect of the present invention a method for controlling a dishwasher comprising a water sump, a circulation pump, a TRIAC connected to the circulation pump for providing electrical power to a motor of a circulation pump and a drain pump is provided where at least one washing program is provided comprising at least one washing cycle. According to this inventive method at the beginning of the wash cycle, the drain pump is started in case a detected TRIAC firing angle condition indicates a predefined minimum water level. As already explained above any water/air mixture or air that is provided towards the circulation pump resulting in a reduced load of the circulation pump which in turn results in a shift of the firing angle in order to reduce the electrical power provided towards the motor of the circulation pump. Having understood this effect corresponding TRIAC firing angle conditions can be allocated to a minimum water level at which the drain pump is started at the beginning of the wash cycle. On the other hand in case the minimum water level is not reached, the drain pump is not started at the beginning of the wash cycle which results in a reduction of power consumption and noise emission.

In preferred embodiments of this method for controlling a dishwasher the above-discussed methods for detecting a water level in a dishwasher are applied.

In a further preferred embodiment of the inventive method the water level in the dishwasher is generally based on the TRIAC firing angle condition which implies the advantage that no additional pressure sensor is necessary. Hence, it can be controlled by means of a detection of the TRIAC firing angle whether at a specific process step additional water input is necessary in order to reach a desired water level in the dishwasher.

A corresponding inventive dishwasher comprises a circulation pump and a TRIAC connected to the circulation pump for providing electrical power to a motor of the circulation pump. The drain pump of the dishwasher is connected to a sump of the dishwasher and means for detecting a firing angle condition of the TRIAC are provided as well as control means for starting the drain pump when predefined conditions of the TRIAC are reached. At least two functions can be assigned to such an inventive dishwasher. At the beginning of the washing cycle the motor of the circulation pump can be started first at low speed set point. In case there is no water or not enough water within the dishwasher the motor of a circulation pump is out of any control (but still relatively silent in comparison to a drain pump). This means that the motor speed can be at maximum possible value (e.g. around 2800 rpm) or the motor is stopped. The corresponding TRIAC firing angles are random. "Random" means that the sequence of TFA generated by the control loop in order to follow the speed set point is neither regular nor smooth but on the contrary is quite irregular and highly fluctuating. In an inventive dishwasher it can hence be defined that the drain pump is only started in case predefined conditions of the TRIAC are reached where enough water is within the sump of the dishwasher so that starting of the drain pump make sense. This would typically be the case when the detected TRIAC firing angles are relatively stable. A TFA or a sequence of TFAs can be defined as being "stable" if, at a fixed constant set point speed, its maxima/minima are deviating less than 10% or 15% from the TFA average value. TFA average values typically vary from 0 to $1/(2*f)$ (f being the mains frequency). Hence, in case of a 50 Hz mains frequency, the TFA can vary from 0 to 10 msec. A typical motor speed of 1900 rpm can be obtained with a TFA of e.g. 2.5 msec. Therefore a TFA varying e.g. from 1 to 4 msec or even from 2 to 3 msec around its average value can be assigned to an unstable condition for the pump. Alternatively, the TFA can be considered stable if its standard deviation divided by its average value is below 5 or 10%.

The drain pump is not started in case a random distribution of TRIAC firing angles is detected. Such a random distribution can be assigned to TRIAC firing angles that are outside at least one (or a plurality) the above limits for stability. Hence, the overall noise is reduced (since the drain pump is only started in case the water level in the sump turns out to be high enough). In addition, additional pressure switches are made absolute since they can be replaced by a zero cost algorithm which is added to the usual algorithm that controls the firing angle in known dishwashers.

BRIEF DESCRIPTION OF THE DRAWING

Preferred embodiments of the invention will be described below by reference to the drawing, in which:

FIG. 1 is a schematic illustration of the motor speed control loop.

DETAILED DESCRIPTION

FIG. 1 shows the schematics of a control loop for controlling the speed of a motor 20 of a circulation pump of a dishwasher. As an input, a speed set point 10 is sent to a comparator 12 where the speed set point 10 is a given motor speed (e.g. 2000 rpm) as it is pre-set by a specific washing program. The function of comparator 12 is to generate a speed error signal 14 by comparing a detected motor speed 22 of a motor 20 with the applied speed set point 10. This speed error signal 14 is fed to a motor control algorithm 16 running in a control unit of the dishwasher which in turn calculates a TRIAC firing angle 18 (TFA) to be applied to the motor 20. TFA 18 is hence based on the speed error signal 14 and also on a zero crossing signal (ZC) 26 which reflects the zero crossing of the applied voltage. The schematic hence represents a feedback loop where on the one hand a speed set point 10 is applied as a target value for the motor speed 22 of the motor 20 and on the other hand the motor speed 22 itself is detected by means of a (not shown) tachometer, while the ZC 26 is detected by means of a related circuitry. In conclusion the effective motor speed 22 is detected and a deviation from speed set point 10 leads to an according speed error signal 14 coming from the comparator 12. As a result, motor control algorithm 16 adapts the TFA 18 so as to bring back the motor speed 22 of motor 20 towards the speed set point 10.

The motor control algorithm 16 may generate different TFAs in different situations. As an example, a specific speed set point 10 is applied according to a specific wash program or wash cycle. The motor control algorithm 16 applies an according TFA 18 (e.g. 4 msec) to the motor 20 and the resulting motor speed 22 is detected and fed back to the comparator 12. A comparison of the detected motor speed 22 and a speed set point 10 leads to the speed error signal 14 whereupon motor control algorithm 16 adapts the TFA 18 so that the motor speed 22 of motor 20 is changed into the direction of speed set point 10. In general, a motor speed 22 that is lower than speed set point 10 hence leads to an increase of the TFA 18 which in turn results in higher supply of power towards the motor 12. In cases where the motor 20 feels a lower resistance since the circulation pump driven by the motor 20 pumps against a lower fluid pressure, the resulting TFA 18 of the feedback loop is decreased so that motor 20 consumes less electrical power and the attached or connected circulation pump (not shown) is driven with less mechanical power.

Based on the function of the described feedback loop the applied TFA 18 is—according to the present invention—used to derive a water level in the dishwasher. This is because the TFA 18 is an indication of the water level and/or the water pressure in the dishwasher.

In principle, different situations can be identified resulting in different TFA (18) conditions:

1. In case no water or only little water is in the dishwasher or in the sump of the dishwasher the motor 20 of the circulation pump runs at its maximum speed since although a very small TFA (18) is applied, the feedback loop of FIG. 1 is no more in a situation where a specific speed set point 10 can be reached. Since the motor control algorithm 16 on the one hand cannot go below a minimum TFA 18 and on the other hand the motor 20 works against a very small mechanical load, the motor speed 22 is out of control and hence reaches a preset or motor-specific maximum. Such a condition can be assigned to a low water level in the dishwasher.
2. In case that the water has reached a higher level within the dishwasher the feedback loop works well and the motor speed 22 can easily be controlled so as to follow the speed set point 10. The according water level can be signed to a condition where e.g. an additional water input is not necessary.
3. Between the situations 1 and 2 a third condition can be detected where the feedback control is not able to set the motor speed 22 onto the speed set point 10 in a continuous manner and where also the motor speed 22 is not at maximum speed but where the effective motor speed 22 is fluctuating. The amount of such a fluctuation of the motor speed 22 correlates in general with the water level in the sump of the dishwasher. The more water that is in the sump the closer the motor speed 22 is on the speed set point 10. On the other hand the less water being in the sump the closer the system is near the out-of-control situation and the bigger the speed variations of the motor speed 22 with respect to the speed set point 10 are. Since the above discussed feedback loop is applied to control the motor speed 22, any variations of the motor speed 22 lead to variations of the applied TFA 18 which now can be used as an input also to a control means 24 of the dishwasher where the TFA 18 values can be analyzed.

In further embodiment of the present invention empiric or predefined values for applies TFAs can be stored in control means 24 and TFA values 18 that are fed into the control means 24 can be compared with this data so that specific water level conditions can be assigned to the applied and analyzed TFA values 18. Based on this analysis of TFA values 18 on the one hand the water level in the dishwasher can be analyzed or derived so that additional sensors like pressure sensors for the detection of the water level are obsolete. On the other hand, based on this method a dishwasher can be controlled in a way that at the beginning of the wash cycle a drain pump of the dishwasher is only started in case an applied TFA 18 indicates a predefined minimum water level.

As a result, in case the sump of the dishwasher is empty or nearly empty so that the drain pump needs not to be started this results in a reduction of power consumption and noise reduction.

The invention claimed is:

1. A method for controlling a dishwasher comprising a water sump, a circulation pump, a triode for alternating current (TRIAC) connected to the circulation pump for providing electrical power to a motor of the circulation pump and a drain pump, where at least one washing program is provided comprising at least one washing cycle, wherein, at the beginning of the wash cycle, the drain pump is started in case a TRIAC firing angle condition indicates a predefined minimum water level, and wherein predefined TRIAC firing angle conditions are assigned to specific water levels in the dishwasher.

2. The method of claim 1, wherein a water level is detected by using a firing angle condition of the TRIAC to derive the water level in the dishwasher.

3. The method of claim 1, wherein the control of a water level during a running wash cycle is based on a TRIAC firing angle condition.

4. A method for detecting a water level in a dishwasher comprising a circulation pump and a triode for alternating current (TRIAC) connected to the circulation pump for providing electrical power to a motor of the circulation pump, wherein a firing angle condition of the TRIAC is used to derive the water level in the dishwasher, and wherein predefined TRIAC firing angle conditions are assigned to specific water levels in the dishwasher.

5. The method of claim 4, wherein a speed of the motor is controlled by means of a feedback-loop where the motor speed is detected and an electrical power consumption of the motor is adjusted by adjusting the TRIAC firing angle so as to result in a speed of the motor being as close as possible to a preselected value.

6. The method of claim 4, wherein the predefined firing angle conditions and the specific water levels are based on empiric data and are stored in a control means of the dishwasher.

7. The method of claim 4, wherein the predefined firing angle conditions and the specific water levels are dependent on the motor speed.

8. The method of claim 7, wherein predefined instability conditions for the TRIAC firing angle are defined and assigned to water level conditions where the circulation pump is sucking in air only or a mixture of air and water.

* * * * *